Figure 1:
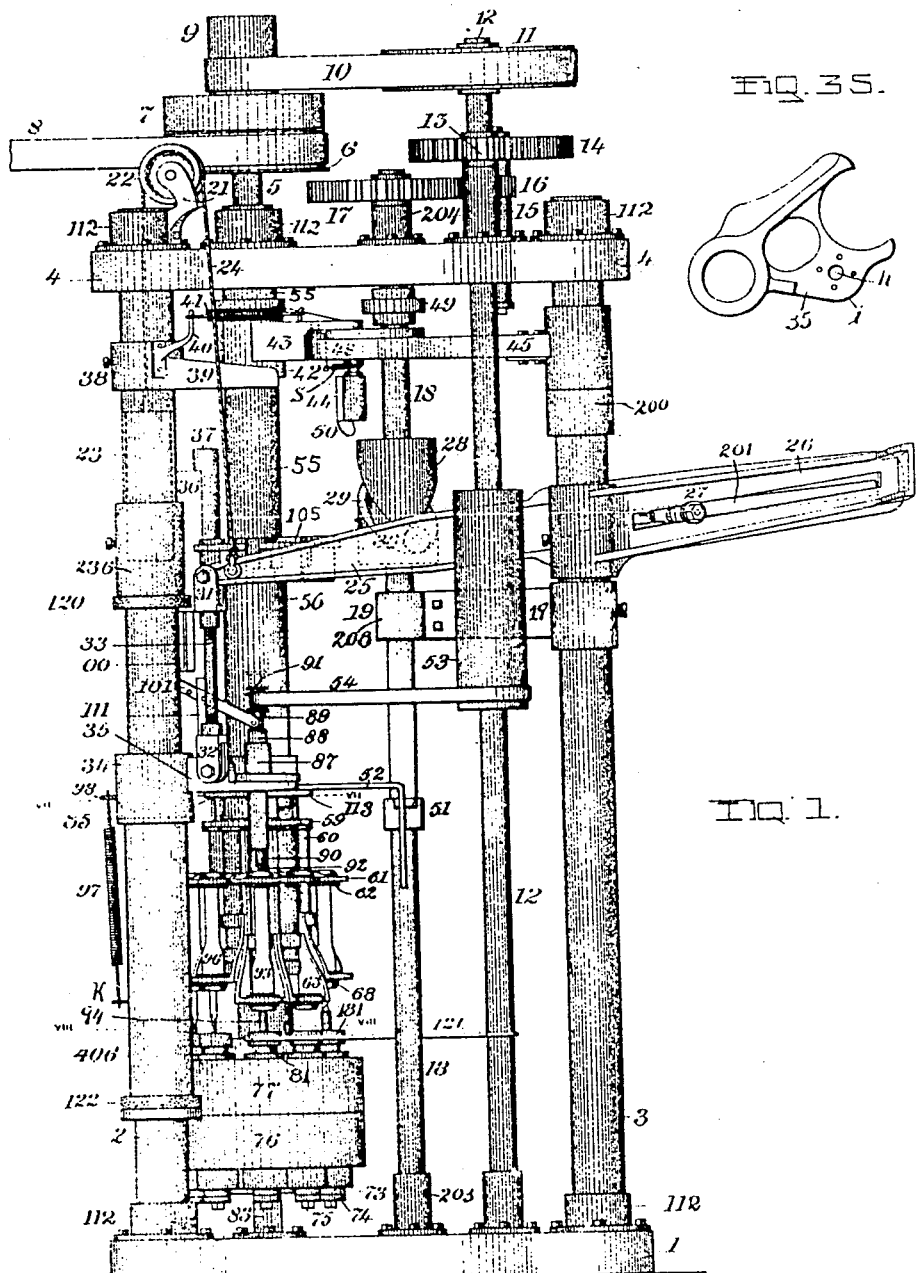

W. C. FARNUM.
MULTIPLE SPINDLE BORING MACHINE.
APPLICATION FILED NOV. 12, 1908.

1,034,005.

Patented July 30, 1912.
10 SHEETS—SHEET 1.

WITNESSES
Charles H. Houghton
Arthur H. Phillips

INVENTOR
WILLIAM C. FARNUM.
by Franklin Scott ATTORNEY

W. C. FARNUM.
MULTIPLE SPINDLE BORING MACHINE.
APPLICATION FILED NOV. 12, 1908.

1,034,005.

Patented July 30, 1912.
10 SHEETS—SHEET 3.

WITNESSES
Charles H. Houghton
Arthur H. Phillips

INVENTOR
WILLIAM C. FARNUM
BY Franklin Scott, ATTORNEY.

W. C. FARNUM.
MULTIPLE SPINDLE BORING MACHINE.
APPLICATION FILED NOV. 12, 1908.
1,034,005.
Patented July 30, 1912.
10 SHEETS—SHEET 4.
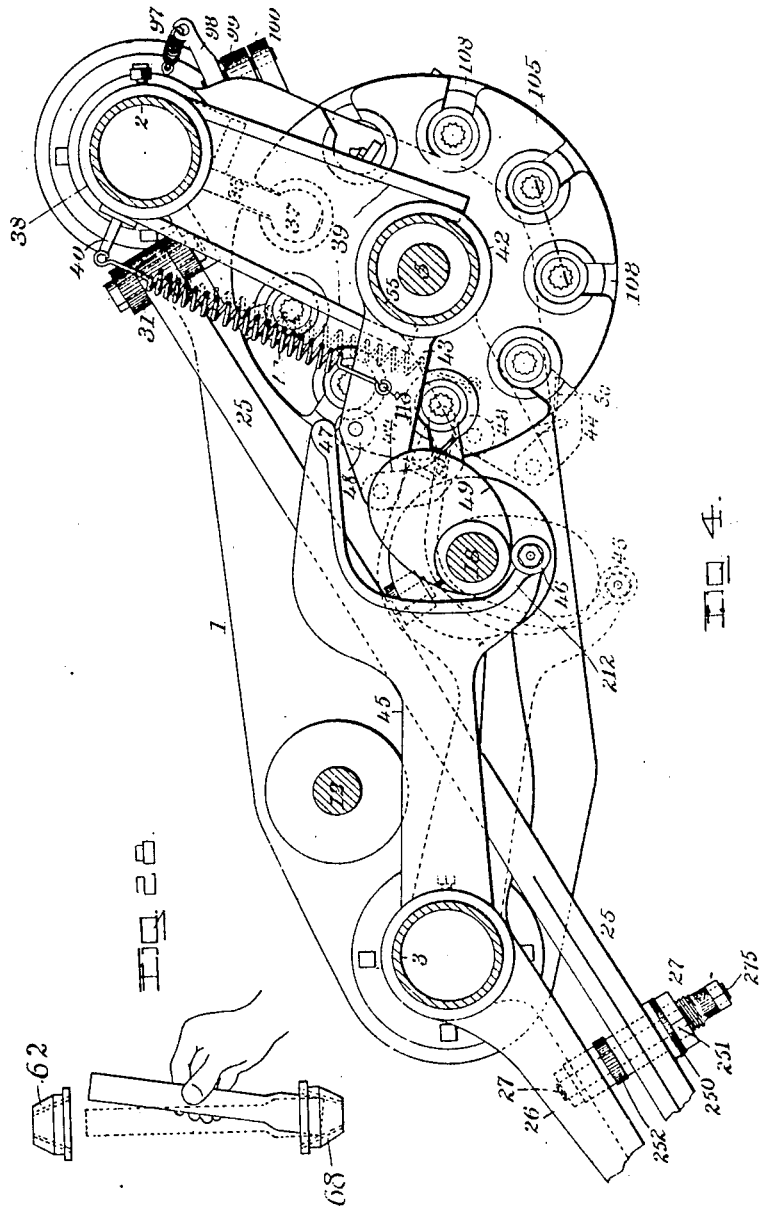
WITNESSES
Charles H. Houghton
Arthur H. Phillips
INVENTOR
WILLIAM C. FARNUM
BY Franklin Scott, ATTORNEY.

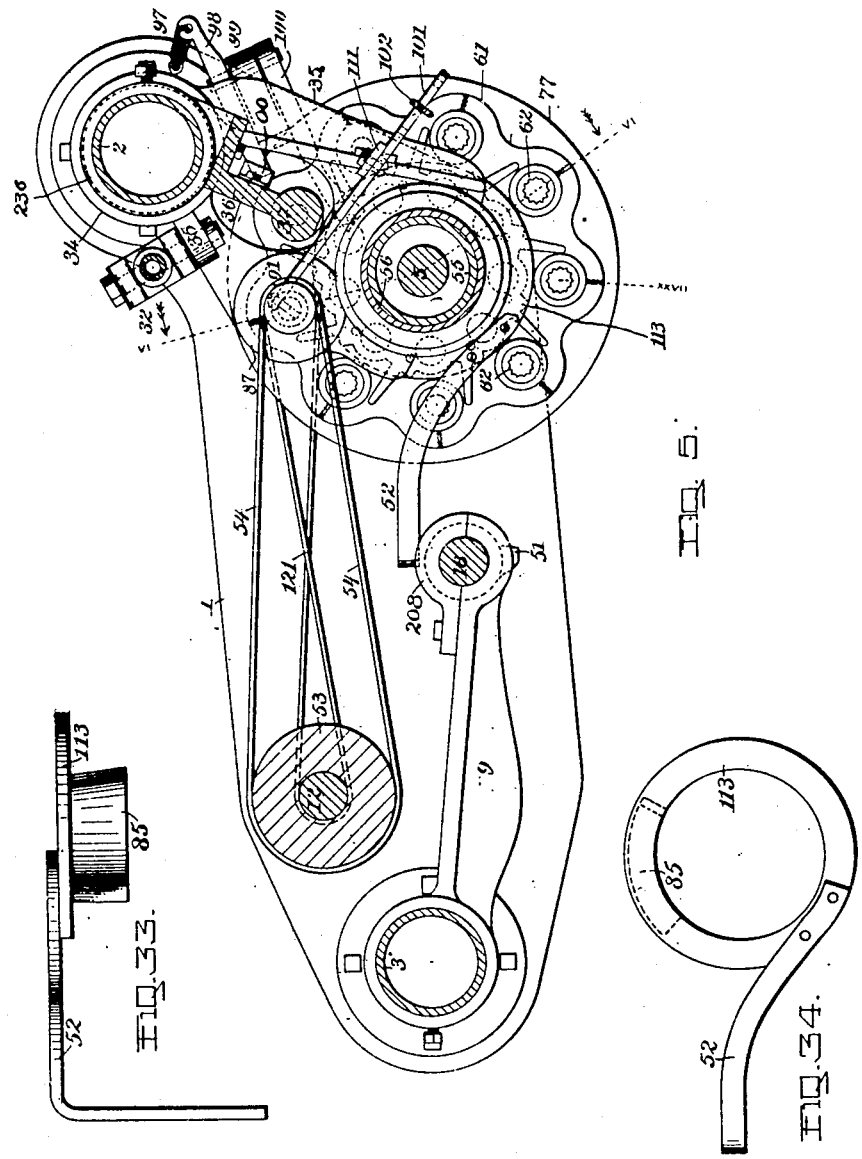

W. C. FARNUM.
MULTIPLE SPINDLE BORING MACHINE.
APPLICATION FILED NOV. 12, 1908.
1,034,005.
Patented July 30, 1912.
10 SHEETS—SHEET 7.
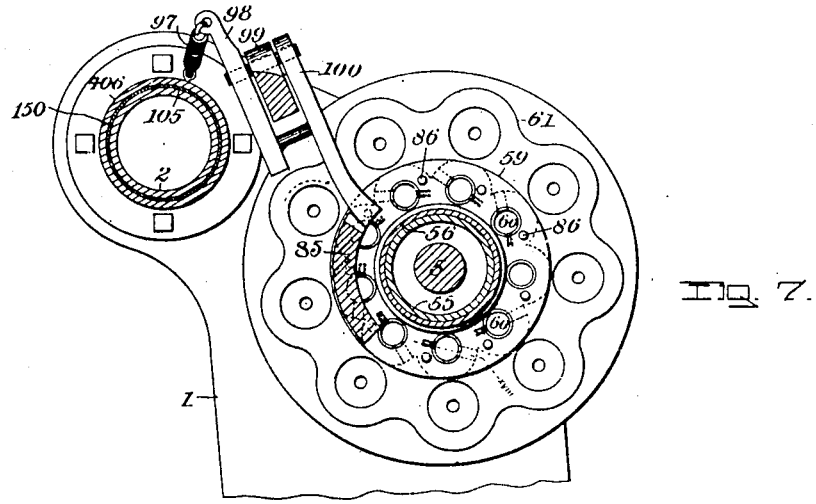
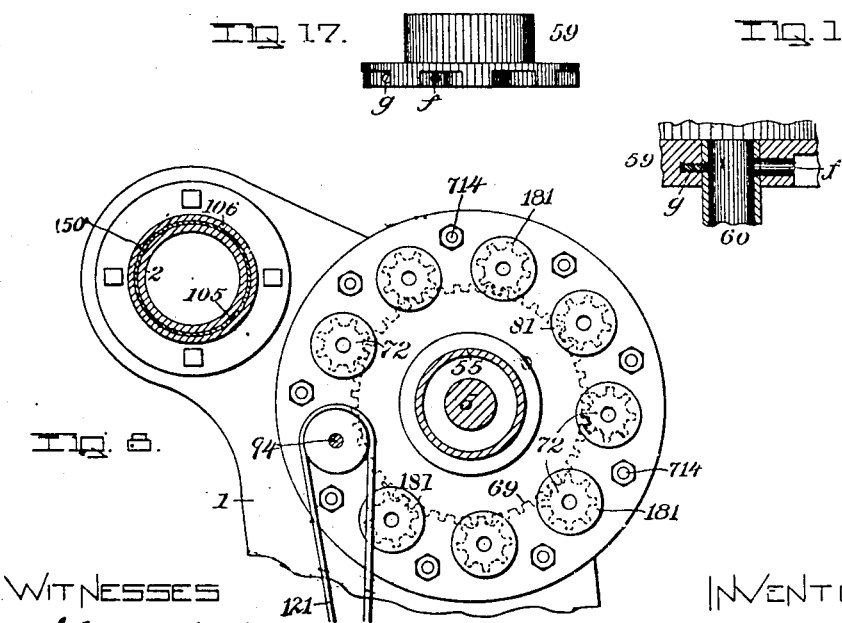
WITNESSES
Charles H. Knighton
Arthur H. Phillips
INVENTOR
WILLIAM C. FARNUM
BY Franklin Scott, ATTORNEY W. C. FARNUM.
MULTIPLE SPINDLE BORING MACHINE.
APPLICATION FILED NOV. 12, 1908.
1,034,005.
Patented July 30, 1912.
10 SHEETS—SHEET 8.
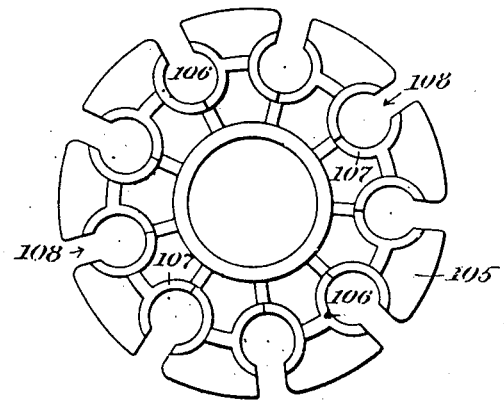
Fig. 11.
Fig. 19.
Fig. 20.
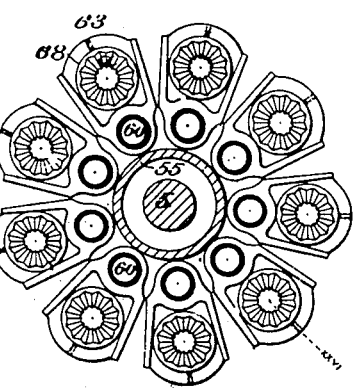
Fig. 21.
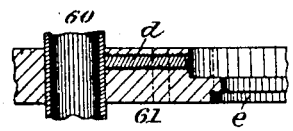
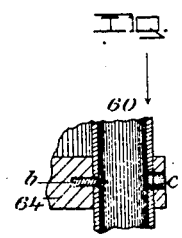
Fig. 22.
Fig. 9.
WITNESSES
Charles H. Houghton
Arthur H. Phillips
INVENTOR
WILLIAM C FARNUM
by Franklin Scott, ATTORNEY W. C. FARNUM.
MULTIPLE SPINDLE BORING MACHINE.
APPLICATION FILED NOV. 12, 1908.
1,034,005.
Patented July 30, 1912.
10 SHEETS—SHEET 9.
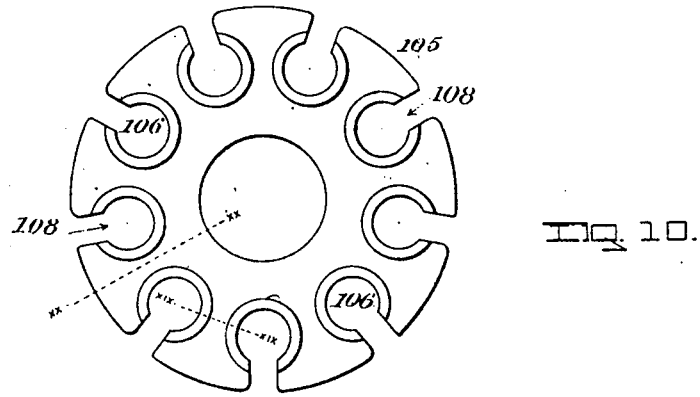
Fig. 10.
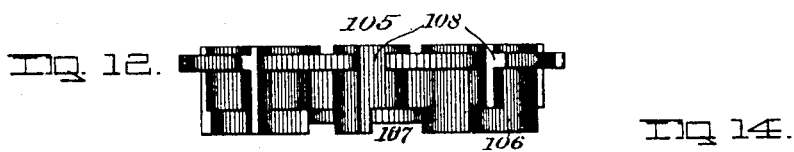
Fig. 12.
Fig. 14.
Fig. 16.
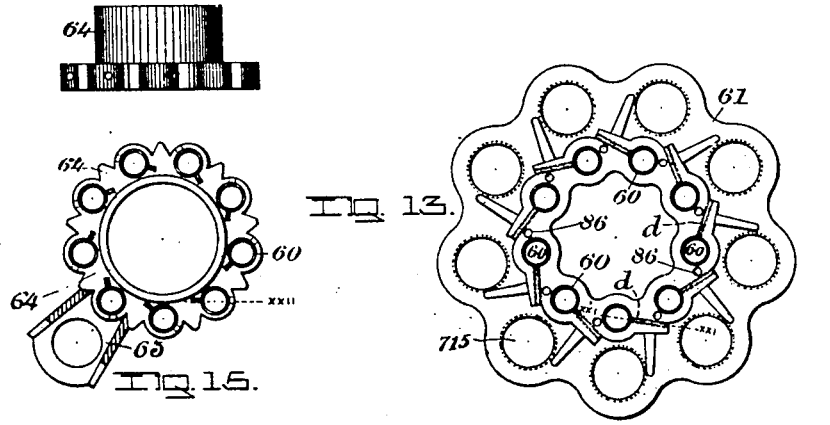
Fig. 13.
Fig. 15.
WITNESSES
Charles H. Houghton.
Arthur H. Phillips.
INVENTOR
WILLIAM C. FARNUM
BY Franklin Scott, ATTORNEY.

W. C. FARNUM.
MULTIPLE SPINDLE BORING MACHINE.
APPLICATION FILED NOV. 12, 1908.

1,034,005.

Patented July 30, 1912.
10 SHEETS—SHEET 10.

WITNESSES
Charles H. Knighton
Arthur H. Phillips

INVENTOR
WILLIAM C. FARNUM.
BY Franklin Scott, ATTORNEY

UNITED STATES PATENT OFFICE.

WILLIAM C. FARNUM, OF ARLINGTON, VERMONT, ASSIGNOR TO U. S. BOBBIN & SHUTTLE COMPANY, OF PROVIDENCE, RHODE ISLAND, A CORPORATION OF NEW JERSEY.

MULTIPLE-SPINDLE BORING-MACHINE.

1,034,005.  Specification of Letters Patent.  Patented July 30, 1912.

Application filed November 12, 1908. Serial No. 462,209.

*To all whom it may concern:*

Be it known that I, WILLIAM C. FARNUM, of the town of Arlington, in the county of Bennington and State of Vermont, have invented certain Improvements in Multiple-Spindle Boring-Machines, of which invention the following specification, in connection with the accompanying drawings, constitute a specification.

This invention relates to that class of machines wherein a gang or series of boring tools, like bits, drills, reamers or counterbores are arranged to operate upon blanks of any material which blanks are successively presented to them for their specific action.

In some kinds of blanks it is necessary to have bores of three or more diameters with two or more tapered portions, and in other kinds of work the length of the bored portion is so great in proportion to its diameter that only a part of the distance can be bored without withdrawing the boring tool for the purpose of discharging the accumulated chips or cuttings. In cases of the latter class several tools of gradually increasing lengths are used.

The machine is also adapted to bore any material in which bores of considerable depth or of varying diameters are required, but its embodiment as herein disclosed and illustrated relates to improved mechanism for boring wood blanks to be used in the manufacture of bobbins for use in textile manufactures, &c., and to methods for treating the object operated upon.

The invention as herein described embraces an organism wherein an annular series of boring tools is concentrically arranged around the base of a stationary vertical hollow pivot standard in the center of which the main driving shaft is mounted and revolves. From this shaft by appropriate gearing the boring tools, which run in fixed bearings and are axially stationary, are rotated. This standard is externally fitted so that various appliances may rotate or slide longitudinally thereon. Above the series of boring tools a reel is pivoted on the standard which carries chucks for holding the blanks to be operated upon by means of end-clamping jaws. These chucks are disposed in vertical opposition to the boring tool spindles below them and correspond therewith in number and working position. By appropriate mechanism dependent on the main driving shaft for its movement, both intermittent and reciprocating motion is imparted to the chuck-reel, so that each blank held by any of the chucks will be subjected to the formative action of each tool of the series of tools in the boring apparatus. Means operating in connection with the chuck-reciprocating devices impart to the chuck-reel a shock at some part of its stroke which tends to dislodge the boring chips or cuttings from each blank in the course of its manipulation.

Certain subordinate details of the machine and ancillary thereto will be made the subject-matter of other applications, not yet filed.

The invention is fully illustrated in the drawings wherein—

Figure 2:
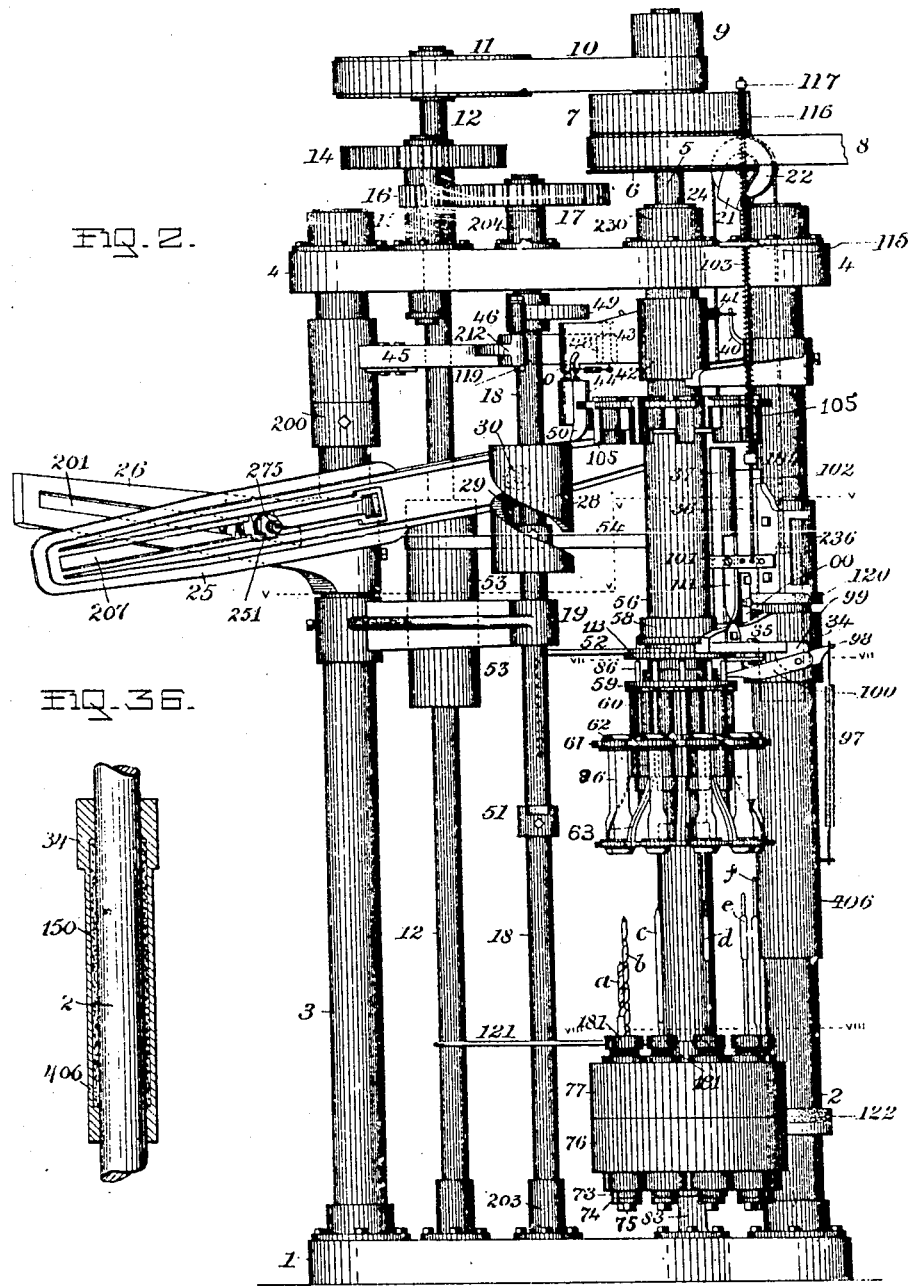
Figure 3:
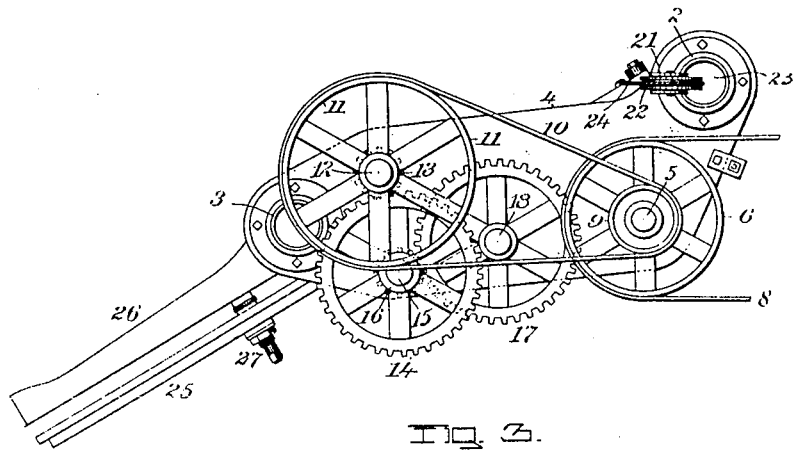
Figure 23:
Figure 24:
Figure 25:
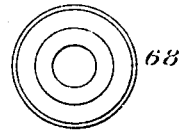
Figure 26:
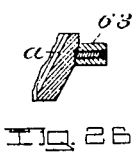
Figure 27:
Figure 6:
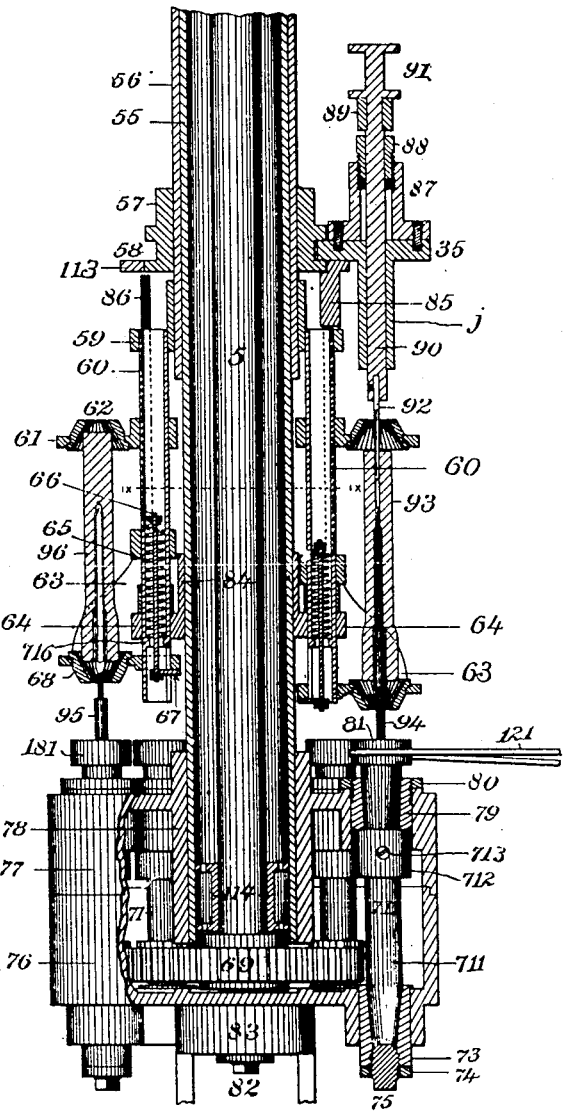
Figure 29:
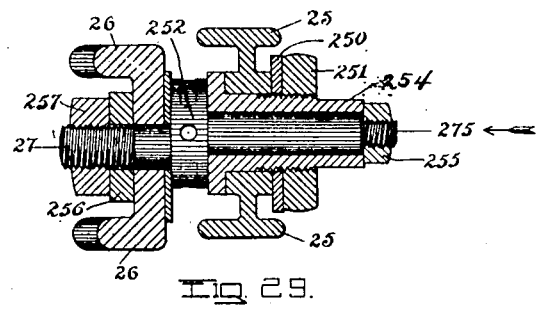
Figure 30:
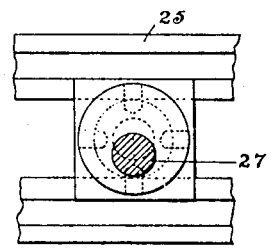
Figure 31:
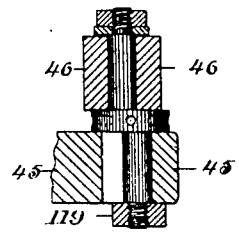
Figure 32:

Figure 1 shows a front elevation of the machine as seen from the operator's side. Fig. 2 is an elevation of the opposite side. Fig. 3 is a top plan view. Fig. 4 is a horizontal plan view of the parts beneath the upper frame plate. Fig. 5 is a sectional plan view of parts beneath the section line V, V, Fig. 2. Fig. 6 is a partial side elevation in section on lines VI, VI, of Fig. 5. Fig. 7 is a partial sectional plan taken on the lines VII, VII, Figs. 1 and 2. Fig. 8 is a partial sectional plan taken on the lines VIII, VIII, of Figs. 1 and 2. Fig. 9 is a plan view of the series of centering cones of the movable chuck jaws. Fig. 10 is a view of one side of the registry disk used to aid in effecting accurate registry of the axes of the chucks with the axes of the boring tools. Fig. 11 is a view of the opposite side of said registry disk. Fig. 12 is an edge view of said disk. Fig. 13 is a top view of the chuck-centering plate. Fig. 14 is an edge view of said plate. Fig. 15 is a top view of the lower reel head, 64, Fig. 6, showing ends of the tubular chuck-jaw slides. Fig. 16 is an edge view of the lower reel head. Fig. 17 is a side view of the upper reel head 59. Fig. 18 is a sectional detail showing mode of fastening top ends of the jaw-slides in the upper reel head. Fig. 19 and Fig. 20 are sections taken on the lines XIX, XIX, and XX, XX, respectively, of the registry disk as seen in Fig. 10. Fig. 21 is a radial vertical section taken on the line XXI, XXI, of Fig. 13, and shows mode of fastening jaw-slides in the chuck-centering plate. Fig. 22 is a section taken on the line XXII, XXII, of Fig. 15, showing mode of fastening the jaw-slides in the lower reel head. Figs. 23, 24 and 25 are respectively inside, external and bottom views of one of the chuck-centering cones. Figs. 26 and 27 show mode of fastening the cone centers to their seatings. Fig. 28 shows mode of insetting the bobbin blanks between the chuck centers by hand. Figs. 29, and 30 are details of an adjustable eccentric stud upon which the lever oscillates which reciprocates the chuck reel and its appendages upon the pivot standard. Fig. 31 is a modified form of said stud and bearing. Fig. 32 is an end view of the pivot stud seen in section in Fig. 31. Figs. 33 and 34 are respectively edge and plan views of the segment ring 113. Fig. 35 is a top plan view of the bracket fork attached to the beam 25 to reciprocate the chuck sleeve and reel. Fig. 36 is a longitudinal section through the sleeve 406 and shows an interlay of lubricating packing between the post on which it may slide and the said sleeve.

Boring machines of this class may be divided into two classes, those in which a blank is centrally bored for the purpose of being externally finished on a mandrel, the bore thereafter being of no use or consequence, of which common thread spools are examples, and another class wherein the object is to produce a straight, true axial bore in a blank destined for active service in the production of some other article, upon the perfection of which depends the perfect operation of the finished blank as well as the quality of the work in the production of which the bored element enters as a factor. Of this latter class factory bobbins upon which yarn is wound are examples. In the latter case if the spindle is not straight and true and perfectly centered so it will run without vibration, a perfect bobbin may help to but will not fully correct its imperfect action; while if the spindle is correct in form and action, unless the bore of the bobbin is absolutely straight and true and fits the spindle, bad results will follow. As such bobbins must run truly without vibration and are constantly in process of being filled and emptied, the importance of perfect boring becomes a vital matter in their manufacture.

In designing and perfecting boring machines of this class, one of the worst difficulties to overcome which has hitherto perplexed inventors has been to prevent the borings from interfering with the advancing and cutting movement of the boring tool, especially in boring endwise in wood, and in disposing of the boring dust and chips after they have been made so that they will not fall or be carried into a position where they will impede the advance or cutting action of the tool. If the blank is held under the tool so that it bores downwardly, the chips and boring dust by gravity fall back into the hole where they are liable to pack into the bore and not only interfere with the cutting action of the tool but generate intense frictional heat, sufficient in some cases to draw the temper of the tool, or to destroy it altogether.

In the development of this invention special regard has been had to construct and arrange all working parts of the machine to favor quick and free delivery of all chips and boring dust from the hole in the blank as fast as it is formed. With this object in view the leading idea has been to adopt the vertical instead of the horizontal position for all the rotating parts, such as the boring tools, the blanks and the blank chucks, the rotating reel in which they are mounted, as well as all those parts which reciprocate. Thus in boring the blank the boring tool points upwardly while the hole in the blank produced by the action of the tool opens downwardly. So arranged the instant a tool commences its cutting action on the end of a blank, the chips by their own gravity immediately fall away. Hence this machine is differentiated from others in one respect by this feature.

Another characteristic feature of the invention is that the boring tools are arranged in a gang and journaled in stationary vertical bearings in which they have no axial movement and point upwardly, while the blanks are supported in a vertical position upon a carriage which is reciprocated vertically toward and away from the tools in connection with means for intermittently rotating said carriage between its reciprocations so as to carry a given blank from tool to tool to effect the successive borings.

As all bits or drills are not self-clearing this matter of vertical position becomes one of great importance. It is also true that boring tools work most effectually and accurately if mounted in stationary housings and have no longitudinal movement in the direction of their axes. A solid stationary base for the bearings without axial motion for the tools permits much finer adjustments for the tools and greater accuracy and speed in their operation than when they are mounted on movable carriages or where the boring spindles have axial movements in their bearings toward and from the work. The more working joints there are between the power and the tool the greater the friction if they work closely, and the greater the lost motion and imperfect action if they do not work closely. It is of vastly greater importance that the tool operate rapidly and accurately than that the blank be held in a fixed position to be operated upon. Hence, boring tools operating upon the work either downwardly or horizontally are not equivalents of boring tools operating upon the work upwardly, because they will not remove chips so effectively, develop more frictional heat in action and cannot be run so rapidly.

Boring tools mounted on movable carriages or which have axial movement in their bearings are not equivalents of boring tools journaled in solid, stationary bearings that have no axial movement. Blank carriages or chucks which move horizontally or upwardly to present the work to the boring tools are not the equivalents of like carriages or chucks which move downwardly to present the work to the boring tools, because in the latter the hole in the blank as it is being bored opens downwardly and is constantly clearing itself of chips by the action of gravity which is not available in the other positions of the blanks.

In the operation of boring blanks in any position, if the blank revolves, the centrifugal force developed by rotation impedes and often prevents the clearance of chips from the bore, the chips being driven by such force to the inner wall of the bore, will cling thereto persistently while rotation continues, and they can only be displaced by stopping the rotation of the blank or by artificially removing them. In cases where either the blank or the boring tool is reciprocated to clear the hole, as is necessary where pod and other kinds of bits are used, if the blank rotates, such reciprocation will not clear the hole completely but a considerable portion of the chips and boring dust will adhere to the inside of the bore, being held there by centrifugal force. This difficulty is greater where the blank is rotated in a horizontal position than when it occupies a vertical position with the boring tool below it so that gravity can aid in the escape of the chips. Furthermore, in ma chines where the chuck for holding the blank rotates, if the blank is not straight, or is not truly centered in the chuck, or is out of balance, rapid rotation of the blank will set up vibration of the chuck which prevents correct boring besides inducing frictional heat and injury to the boring tool, all of which evils are avoided in a very great degree by holding the blank and rotating the tool.

The arrangement here shown of an annular series of axially immovable boring tools mounted in stationary bearings, a corresponding series of blank chucks carried on an intermittently revoluble, reciprocating chuck reel, and a registry device for maintaining accurate alinement of the axes of the boring tools with the axes of the chucks, all concentrically disposed about a central vertical hollow pivot standard in which the main driving shaft is journaled all contributes to ease and accuracy of performance, which ease and accuracy insure a largely increased output of accurately finished blanks. A machine embodying this invention as herein set forth has turned out a product of 1500 bobbins per hour all perfectly bored, an output more than double that of any other known machine designed for like service.

*Frame and driving apparatus.*—The frame of this machine consists of a base plate 1, two upright tubular posts 2, and 3, a cap plate 4, and a hollow pivot standard 55, which is seated in a tubular socket 78, of the gear-case 76—77, Fig. 6. This gear-case rests upon a pedestal 83 which is firmly bolted to the base plate as seen in Figs. 1 and 2. All these vertical members are fitted so that hubs, sleeves or brackets may either turn or slide thereon. The posts are secured at their ends by flanged collars to the base and cap plates. The pedestal 83 carries a step-bearing 82, upon which the main shaft 5 is supported. The pivot standard 55 is secured at its upper end in a flanged collar 230 which is bolted to the upper side of the cap-plate 4, and is fitted with two internal bearings 114 (the upper one not shown) in which the shaft 5 is journaled, Fig. 6. Bearings 114 are perforated for the passage of oil, and other parts are similarly provided with oil ducts. Shaft 5 carries at its upper end fast and loose pulleys 6 and 7 and is driven from some prime mover by the belt 8. At the top of shaft 5 is a pulley 9 from which the belt 10 leads to pulley 11 on the top of shaft 12. This shaft carries a long drum 53 which by belt 54 drives the spindle 90 which carries a back-boring bit 92. Shaft 12 also drives the spindle 711 in the gear case through belt 121, Figs. 1 and 6, which connects with the pulley 81 on spindle 711. Shaft 12 also carries a pinion gear 13, Fig. 3, which meshes with gear 14 on counter shaft 15, and through pinion 16 on same countershaft drives gear 17 on shaft 18. Shaft 18 carries a fixed cam 49 which imparts to the chuck-reel its step by step feed motion, also cam 29 which imparts through intermediate devices vertical reciprocation to the chuck-reel to force the blanks onto the boring tools and to withdraw them, and the cam 51 which acts through arm 52 and other devices to release the movable chuck-jaw so that it may seize and center a new blank when placed in position between the chuck centers ready to be seized. By reason of the attachment of the standard 55 to the base and cap plates in the manner shown, it serves in a very efficient way to reinforce the strength of the entire frame operating as it does in the nature of an additional post. Its vertical position affords facilities to arrange details of mechanism on all sides of it, an advantage which does not exist where the horizontal attitude of the machine is adopted. This circumstance contributes to the production of a very symmetrical and compact machine which occupies a minimum of floor space and is accessible for use or repairs on all sides.

*The boring apparatus.*—The organization and mode of action of the boring mechanism may be seen in Fig. 6. It comprises a system of tools or bits for boring the spindle chamber and through the tip of the blank, a reamer which is a counterpart of a mule spindle, a mandrel for impaling the bored blank while being re-bored, and a single bit which bores from the tip of the blank downwardly a very short distance to enlarge and correct the main bore, which tip forms the seat for a lathe center used in a subsequent process of turning the outside of the bobbin. The bottom part of the main bore and the lower part of the upper small bore form bearing seats for the butt and tip of the mule spindle in practice.

Referring to Fig. 6 it will be seen that a gear case is provided consisting of a cylindrical inclosure composed of two halves, 76 and 77. The lower may be cast integral with the pedestal 83 or may be separate and attached thereto. In the center of this half a step or thrust bearing 82 is located which supports the main shaft 5. This shaft at its lower end is fitted with the main driving gear 69, and extends upwardly through bearing 114, and hollow pivot standard 55 to the top of the machine, where, as before explained, it is driven by the belt 8. The upper section of the gear-case, 77, is provided with the concentric standard socket 78, in which the hollow standard 55 is permanently seated, the latter carrying the bearings 114 for the shaft 5. The heads of this gear case are perforated for the insertion and seating of bush-bearings 73 and 79 all but one of which carries a spindle 71, fitted with a pinion 72, Fig. 8, which meshes with gear 69 and is driven thereby. One spindle 711, is independently driven by a belt or cord 121 from shaft 12 through a pulley 81 at the top of the spindle. This spindle is taken out of engagement with the driving gear 69 for the purpose of rotating it backward and reducing its speed. The lower bush bearings 73 are flanged at their tops and fill sockets in the head of the lower section of the gear case into which they are either pressed or screwed so that the flanges lie on the upper side of the head as seen in Fig. 6. These bearings are bored to fit a taper on the end of the spindle which runs in them. An adjusting plug 75 is screwed into the lower end of each of them until its upper end meets the bottom of the spindle and its position is secured by a check-nut 74 as shown. The spindles are all provided with an enlargement or collar 712 which when in working position bears against the under end of the bush-bearing 79 to prevent a lifting movement of the spindle. The socket for the upper bearing is made large enough that the spindle with the collar can be lifted up through it. The upper collars are fitted to be held by set-screw 713 in the sockets and their upper ends are screwthreaded to take on the nuts 80, Fig. 6, which serve as check nuts to secure the bearings 79 in their adjusted positions. These boring spindles are arranged within the gear case in a concentric circle equally spaced around the pivot standard 55, and each is fitted at its upper end with a suitable drill chuck for holding the boring tool or a mandrel. In this case all the spindles are so equipped but one. But it is not material whether all the spindles are provided with tools or not. The preferred arrangement is to employ enough bits or drills of progressively increasing lengths as the boring proceeds to permit of a relatively short feed stroke of the blank chuck so that each bit bores only a short distance before it is withdrawn and the blank is moved to the next longer tool. The two halves or sections of the gear case 76, 77, are united by a concentric joint and are bolted together by bolts and nuts as shown at 714, Fig. 8. Thus it is apparent that the mountings and housings for the boring tools which perform the principal and chief part of the work of producing the bore of the blank, are all stationary and solid. each spindle running in its own fixed bearings, so that the tool can have no longitudinal movement whatever, and its bearings are permanently fixed when in service.

*The chuck-reel and chucks.*—The construction of the chuck-reel and chucks is shown in Fig. 6. The reel consists of two heads 59 and 64 each of which is a flanged cylinder. the upper one being rigidly attached to sleeve 56 and the lower one fitted to standard 55. These heads are connected by as many cylindrical pipe-slides 60. 60, as there are bits or boring spindles and they are concentrically arranged around the pivot standard 55 and are equally spaced. They are rigidly attached to the heads so that the movement of the sleeve 56 either vertically or rotatably will carry this reel, so constructed, with it. A plate 61, shown in plan in Fig. 13, perforated with holes to register with the position of the slides 60 is fitted to be adjustable vertically on the slides 60 by means of set screws *d*, which pass through the web of the plate and bind against the slides 60 as seen in plan in Fig. 13 and in section in Fig. 21. By loosening all the set-screws *d, d, d*, the plate will be released from the slides 60, 60, 60, and its elevation with reference to the series of lower chuck jaws can be regulated. This provision is to render the bobbin chucks adjustable to different lengths of bobbin blanks. The chuck-plate 61 is provided with seat-openings 715, Fig. 13, coinciding in number and position with the number of boring spindles, each of which takes in a female, internally serrated, conical chuck center 62, which is fastened therein so that the center of its opening will be in alinement with a boring spindle when in service. The lower chuck center 68 is carried in a seat therefor in a vertically movable chuck-jaw 63, seen in plan in Fig. 9, in front elevation in Fig. 1, and in vertical section in Fig. 6. This jaw has a top and bottom hub which is bored to fit the slide 60, so that when the parts are assembled for use the upper hub will come above head 64 and the lower one below it as seen in Fig. 6. The jaw slides 60 extend below the lower head 64 far enough to permit a sliding movement of the jaw 63 thereon. Within each jaw-slide 60 a short distance from its bottom is an internal flange 716, Fig. 6, which forms a seat for the expansive spiral spring 65. Extending through this spring is a rod 66 having at its top a head against the under side of which spring 65 abuts, and at its lower end a lifting finger 67 which plays vertically through a slit in the lower end of slide 60 and connects with the underside of the chuck jaw 63. The arrangement and construction of these parts is such that the expansion of spring 65 will draw the jaw 63 upwardly to its limit which will be determined by the length of the bobbin blank. Its movement in the opposite direction is put under the control of a loose sliding push-pin 86, of which one is provided for each jaw, which rests on the top of the jaw and extends through guide holes provided therefor in head 59 and chuck plate 61. By depressing this pin the jaw 63 will be pressed down or away from the chuck center 62, thereby opening the jaws and releasing any blank which may have been held between them. This depression is effected by a finger 100 acting on the top of the pin, and it is thereafter sustained by the oscillating segment ring 113, shown in elevation and plan in Figs. 33 and 34, and in section in Fig. 6. This segment stop 85, is located in the path of the tops of the pins 86 as they are carried around the standard 55, and, by means elsewhere explained, when they approach the end of this stop each one is successively depressed until its top end descends to a point where it can be carried under the lower edge of this segment which holds it down during two reciprocations of the chuck reel in which interval of depression the finished blank will be discharged and a fresh one introduced to the chuck.

*The chuck-reel reciprocating apparatus.--* The mechanism for imparting to the chuck reel and chucks their appropriate vertical movements to force the chucked bobbin blanks down upon the several boring tools and to withdraw the same at the end of each downstroke, consists of the following described mechanism. Post 3, Figs. 1, 2 and 4, carries a fulcrum bracket 26, which is vertically and circumferentially adjustable thereon and is slotted as at 201 for the passage of a pivot-stud-shank 27, Figs. 1 and 29. The details of this pivot stud are best shown in Fig. 29. A section of the bracket is shown at 26 and of the beam at 25. This beam and its purpose will be hereinafter described. Between the beam and bracket is a cylindrical spanner head 252 from one side of which the eccentric shank 27 extends through the slot 201, Fig. 2, and is confined therein when its adjustment has been established by the nut and washer seen in Fig. 29. From the opposite side of the spanner head a concentric pivot stud 275 projects fitted with a binding nut at its outer end. This stud 275 is adapted to oscillate within a flanged journal bushing 254, Fig. 29, which is fitted to slide in slot 207 of the beam and is screw-threaded to receive the nut 251 by which it may be firmly attached to the beam 25. The pivot stud 275 is held in working position by the nut 255 which screws up to the end of the journal bushing 254. Thus, approximate adjustment of the pivot stud 275 may be obtained by the location of the bracket on the post 3 and of the shank 27 in the slot 201, and more delicate adjustment of the stud may be secured by turning the spanner head 252 one way or the other and tightening nut 257. These adjustments come in whenever a change in the length of bobbins occurs and it becomes necessary to accommodate the stroke of the chuck reel thereto.

On the stud 275 an oscillating beam 25 is pivoted which carries the roller 30 which travels in a cam groove 29 in the cam-cylinder 28. This cam cylinder is carried on shaft 18 and is driven by belts and gearing from above in the manner previously explained. The traverse of the roller through this groove imparts to the long arm of beam 25 a vertical reciprocating motion. At the end of this long arm a pitman is attached which connects at its lower end with a bracket 35 which is an appendage of hub 34 as shown in Fig. 1. This pitman 35 is rendered longitudinally adjustable by means of its two heads 31 and 32 which are tapped and screw-threaded as nuts and the connecting rod 33 which is also threaded at each end to screw into the heads. By these means its length may be varied to accommodate the position of the end of the long arm of the beam when its working position is varied to suit bobbin blanks of different lengths. The hub 34 and bracket arms 35 are integral and firmly connected with a long sleeve 406 which is fitted to slide up and down on the post 3 as it may be actuated by the beam. The bracket arms 35 35, Fig. 5, constitute a fork which takes into the groove or necking 58 Fig. 6, of the upper reel head. The weight of the two sleeves 56 and 406 is counterbalanced by a weight 23 which is attached by cord 24 to the end of the beam and passing over pulley 22 is suspended inside the post 2 within which it can move vertically as the beam reciprocates.

*Step-feed mechanism for the chuck-reel.—* The mechanism for imparting to the chuck-reel and chucks their appropriate intermittent movements to carry the blanks from bit to bit in the successive boring operations, embraces the following parts, most of which are shown in plan in Fig. 4. A swinging arm 43 is pivoted on standard 55 above the registry plate 105, and carries a pawl 44 which coöperates with the radial gaps 108 of the registry plate which in this relation acts as a ratchet for turning the chuck reel. Arm 43 carries a contact roller 48 on its under-side against which arm 47 of the swaybar 45 impinges to produce the forestroke of the pawl 44. This swaybar 45 is pivoted on post 3, and has an arm 212 which carries a roller 46 on its upper side which lies in the path of the actuating cam 49 attached to shaft 18 and revolving therewith. The rotation of cam 49 throws the swaybar 45 from the position shown in full lines in Fig. 4, to that shown in dotted lines. This movement of arm 47, through contact with the roller 48 of the pawl-arm 43, forces it around, thereby carrying the pawl 44 into engagement with one of the gaps 108 of the registry plate and rotates it until, as it descends, one of the semi-tubular guide stops 107 engages the top of the registry bar 37 which at this instant will be in its path. Thus the plate for the moment will be held fixed against movement in either direction by the guide 107 on one side of the bar 37, and the pawl 44 on the opposite side. The holding of the registry plate in this way is for the purpose of allowing the end of the bar 37 fairly to enter the opening 106 of the plate, and for this purpose the highest part of the cam 49, for a short distance, is concentric so that no movement of the pawl 44 takes place at this stage of the operation. After the completion of the pawl-stroke (which stage is indicated by the dotted lines in Fig. 4,) and the cam 49 begins its retreating movement, the contractile spring 41, which connects arm 43 with the bracket 40 on the hub 38 of post 2, retracts, drawing after it the arm 43 which at the same time forces the swaybar 45 back to its first position, by reason of the contact between roller 48 on arm 43 and arm 47 of the swaybar.

The chuck reel being thus locked by means of the registry plate 105 to the registry bar 37, the down stroke of the reel and chucks carrying the bobbin blanks commences, and the whole series of blanks is fed to the boring tools at the same time, the blanks discharging the boring chips and dust downwardly as fast as they are made.

Attached to the point of pawl 44 is a guard finger 50 which serves to prevent the pawl from swinging over the upper side of plate 105 when this plate is rising to be engaged by the pawl. This pawl is also provided with a stop finger O, Fig. 2, which by striking the arm 43 prevents the nose of the pawl dropping too deep into the gap 108 of the registry plate.

*The registry mechanism.—*As the boring tools or bits are arranged in a circle concentric with the axis of the pivot standard 55 and the axis of the driving shaft 5, and are equally spaced, and are both locally and axially immovable, while the series of bobbin chucks is similarly arranged in a concentric circle about the same centers and coincide in number and spacing with the boring tools, their respective axes being coincident when in service, the reel which carries the chucks must have an intermittent rotary motion about shaft 5, equal to one space between the chucks to carry each blank from one bit to the next. In order to secure correct alinement of each bit with the bore in each bobbin blank after the boring has commenced, means are provided to insure this accurate alinement of the axes of the boring tools with the axes of the bored bobbins as held by the chucks, which consists of the following mechanism: A hub bracket 236, Figs. 1, 2 and 5, is fastened firmly to hollow post 2, from which a vertical web 36 projects which supports the vertical bar 37. This bar is adjusted to enter and slide in the tubular guides 106 of the registry plate 105, next to be described. This bar serves both to act as a true guide for the vertical stroke of the chuck-reel and bobbins it may carry and also in connection with the plate 105 acts as a positive lock which prevents any variation of centers between the axes of the boring tools and the axes of the chucks. The registry plate 105 is attached to the upper part of the sleeve 56, Fig. 2, plans and details of which are seen in Figs. 10, 11, 20 and 21. This plate has a series of tubular guides 106, corresponding in number and alinement with the axes of the boring tools and the chucks. Each of these guides has a gap 108 opening radially outward through the periphery of the plate to receive the web 36 of the registry bar 37. Each of these guides, which extends above and below the surface of the plate, has one side thereof cut away as seen at 107, Fig. 20, from the under projection of the guide below the web of the plate 105, to form an arresting stop which will engage the top end of the bar 37 as the chuck reel descends during the intermittent rotation of the chucks from spindle to spindle of the boring apparatus. As this impact occurs at the moment the reel and plate 105 are about to commence their downstroke, the top of bar 37 will enter the guide 106, thus locking the chucks in their proper positions to present the center of each bobbin blank accurately to the point of the boring tool immediately below it. Registry plate 105 is rigidly attached to sleeve 56 at an elevation which will permit it to revolve around sleeve 55 clear of the top of the register bar 37, as clearly seen in Fig. 2.

*The back-boring apparatus.*—The series of bits shown in Fig. 2 of the drawings and there marked respectively a, b, c, d, e and f, are adapted to bore a bobbin with a bore at its bottom which will fit the enlarged butt of a spinning spindle, and a much smaller one through its upper third part the lower part of which will fit the tip of the spindle, and between these two diverse calibers the bore is larger than the diameter of the spindle thus leaving a chamber where the spindle finds no bearing at all. Following these in the series is a reamer bit, (not in view in Fig. 2,) which finishes the interior of the bore by removng all roughness of the inside surface of the hole and at the same time reams the lower part of the bore to a slight taper to more perfectly fit the tapered butt of the spindle. Last in the series of tools is the mandrel 94, Fig. 6, upon which each bobbin is impaled during the back-boring operation at the tip of the spindle. This tip-boring has nothing to do with the finish of the bore for practical purposes, but is an operation for providing a seat for a lathe center to be later used in finishing the exterior surface of the bobbin. Heretofore this operation of centering the tip of the bobbin to prepare it for the finishing lathe has been a distinct step and has been done independently of the boring process requiring the attention of a separate workman and an extra handling of the bored blanks. In this invention it is combined with the boring devices and constitutes the final step in the process of boring and centering the blank, whereby a saving of the time and cost of a workman and an extra handling of the stock is effected. In the structure of the machine this bit for boring the seat at the tip of the blank for the lathe center is carried on a part of the machine independent of the mountings for the gang of boring bits but on one of the fork arms of bracket 35 so that it receives vertical reciprocation therefrom and its rotary motion is also independent of the driving gear for the boring tools. Its spindle is adjusted to be in exact alinement with the axis of the mandrel 94, so that the completed bore will be axially straight. This back-boring bit is mounted and driven as follows:—Hub 34 with its bracket fork 35 is vertically reciprocated as before explained by the vibrations of the beam 25 through the pitman connection 33. The shape in plan of the upper side of this bracket is seen in Fig. 35. A section of a small part of it is shown in Fig. 6 at 35. One fork is enlarged laterally so as to form a seat for a flanged hub 87 which is bored and threaded to take in a bush-bearing 88. This screw-threaded bearing affords means for varying the degree of depression of the spindle 90, which passes through it. Below the arm 35 a long sleeve-bearing for the spindle depends which imparts to the spindle in action great steadiness. The spindle which passes through the arm and both bearings is attached to an actuating lever 101, Figs. 1, 2 and 5, which is pivoted on a standing fulcrum 111, by means of a collar 89 in which the spindle turns and to which one end of the lever 101 is pivoted as seen in Fig. 1. Fulcrum stand 111 is attached to a rib on one arm of the bracket fork 35 as seen in Figs. 2 and 5, so it rises and falls with the bracket 35 and with the chuck reel.
This fact renders it necessary that the opposite arm have an elastic or yielding attachment and therefore that arm is connected with the lower end of a long draft rod 102, Fig. 2, which carries a button 117 at its top end and another 104, just above its lower end. This rod passes through a perforated stop-plate 115 between which and the upper button 117 is an expansive spiral spring 116 which normally exerts its force to lift the rod and consequently to depress the spindle 90. Below the stop plate 115 is another spiral spring 103 which normally exerts its expansive force against the button 104 to force the rod 102 downwardly and consequently to raise the spindle 90. The lever 101 has a plurality of holes in which to connect the end of the rod 102 to vary the extent of the stroke of the arm to which the spindle is connected. It is apparent from Fig. 6 that the collar 89, to which lever 101 is connected, will be limited in its downthrow by the collar striking the top of the bush-bearing 88, which is a fixed abutment. If the downstroke of the bracket 35 should extend beyond the point where the collar 89 strikes the bearing 88, when contact between the collar and the bearing is made, further descent of the bracket will transfer the strain to the fulcrum 111 of the lever 101 and thence through its rear arm to the rod 102 and spring 116 which will yield to such pull. On the upstroke of bracket 35 spring 116 will operate to push rod 102 upwardly until equilibrium between that spring and spring 103 is reëstablished. This will not yet tend to lift bit 92 from the bore but further rise of the bracket will carry the spindle and bit with it and at the limit of the upstroke will leave the blank ready to be discharged from the machine.

The mandrel which carries the blank while it is being re-bored is rotated by a belt or cord 121 which leads from shaft 12 to a pulley 81 on the head of spindle 711, Figs. 1 and 6. This belt may be either straight or crossed, both methods are shown in the figures. If the belt is arranged to run in the same direction as the bit 94 its speed will be relatively low in relation to that of the bit. A high speed of the mandrel can not be employed on account of the vibration and swing of the blank if it happens to be out of balance as is sometimes the case if it is not of full dimensions or if it has a knot or burl on one side to disturb its symmetry, or if it is not straight. The bit 92 is driven by a cord or belt leading from the drum 53 on shaft 12 to a pulley 91 at the top of spindle 90.

*The discharging apparatus.*—As is elsewhere explained, the blanks, while undergoing the boring operation, are held in the grip of the chuck jaws 62 and 68 by virtue of the expansive force of the springs 65 of the several chucks. They are released from this grip by depressing the lower jaw, which leaves the blanks free at their top ends and standing in the cone-seat of the lower jaws, whence they may be removed by hand or otherwise as the case may be. This depression of the jaws 63 is accomplished as follows:—In this case the boring apparatus comprises six bits for boring the blanks, one reamer for shaping the bore to fit the spindle upon which the bobbin is to be used, and a mandrel upon which the blank is impaled while it is back-bored at its tip for the lathe center. This leaves one spindle unemployed. Next below the fork 35 a ring 113 is pivoted on the hub 57 carried by sleeve 55, around which it can oscillate. This ring has segment 85 depending from its under side as seen in Figs. 1, 5, 6, 33 and 34. The length of this segment is equal to a little more than the length of two spaces between the push-pins plus the diameters of two pins, and it is located to cover the tops of the pins which depress the jaw opposite the mandrel 94 and the jaw next to the right of it. The function of this segment is to hold the push-pin under it down during two strokes of the chuck-reel, or while the back-boring is being done on the first stroke and during the next stroke to permit the removal of the finished blank and the insertion of an unbored one. A slight rotary reciprocating movement is imparted to the segment ring 113 by means of a cam 51 on shaft 18, which at each revolution of the shaft acts upon the bent lever 52 which is connected with the ring 113, and through it turns the segment just enough to uncover the top of the push-pin 88 which may be nearest the right hand end of the segment as seen in Fig. 1. As the chuck reel rotates and the upstanding push-pins 86 approach the end of the segment each of them is pushed down preparatory to passing under the segment by means of devices seen in Fig. 7. This figure shows a lever 98 pivoted on an ear 99 which is an integral part of the bracket fork 35. A depressing finger 100 is attached to this lever and extends to a point directly over the top of one of the push-pins 86, and close under the ring 113 when the chuck-reel is down. The outer end of lever 98 is connected by a retractile spring 97 with a stud or hook $k$, on the sleeve 406. This spring normally acts to throw the point of the finger up. Directly over the inner end of lever 98 an arresting bar 00, Figs. 1 and 2, is attached to the web 36 so that whenever the fork 35 is near the limit of its upstroke the end of lever 98 will strike the end of this arresting bar when further elevation of the bracket fork will cause the point of the finger 100 to be depressed, which depression will force the push-pin 86, which at the time may be under the finger, down against the chuck-jaw 63 with which it contacts and thereby release the blank which may at that time be held therein. The rotative feed of the chuck-reel occurs while the registry plate 105 is above the top of bar 37 and while finger 100 is holding a push-pin depressed, and it sweeps the pin under the point of the finger and under the front end of the segment 85, thereby depressing the lower jaw of the chuck below it and releasing its blank. When the rotative feed of the reel has been effected and it begins its descent, lever 98 falls away from the arresting bar 60, and spring 97 contracting, throws up the point of finger 100 thereby permitting the following pin 86 to pass under it to its proper position next to be operated on.

It will be seen in Fig. 1 that segment 85 holds open the chuck jaws opposite the mandrel 94 and the jaws of the chuck next ahead of it. While the blank on the mandrel is being tip-bored by the bit 92, Fig. 6, the attendant can place a blank in the chuck next ahead which will be seized by the chuck jaws the instant cam 51 through lever 52 rotates the segment 85 backward so as to uncover the top of the push-pin connected with the open chuck and let its spring 65 act to close the jaws.

*Mechanism for clearing the bore of the blank of its debris.*—It is not uncommon in using boring machines where the blanks are presented to the boring tools by hand for the workman, after the hole has been started, to give the blank a rap or smart blow to clear the hole of any borings or chips which may remain therein before resuming the boring operation. In this invention special provisions for imparting a sudden shock to the chucks and the blanks they may hold after each boring stroke of the reel before advancing the blank to the next boring tool are made. It has been found by experience that boring the blank from its lower end does of itself promote the clearance of chips and borings from the hole at each operative stroke of the boring tool, but if after the withdrawal of each tool and before another enters the bore the blank is given a sharp blow in an endwise direction it very greatly aids in securing a clear hole for the next operation. This result is effected as follows:—The exterior of post 2 is turned accurately and smooth. The chuck-sleeve 406 is also carefully fitted and is chambered enough larger than the post to leave an annular space between them. This space is filled with an absorbent packing of proper density to hold a lubricant. This construction is seen in Fig. 7, the packing being marked 150. This packing between the post and the reciprocating sleeve, in connection with the delicate balance between the weight 23 and the parts with which it is connected, permits a very quick and easy movement of the sleeve over the packing. But as too sudden a reversal of movement of the sleeve at the end of each stroke would subject the machine to detrimental strain, two buffer collars 120 and 122, one above and the other below the sleeve, are fitted to the post 2 against which the ends of the sleeve impinge with considerable force at each stroke. When the upper end of the sleeve 406 strikes the buffer 120 the blanks have all been carried on the upstroke of the reel clear of the boring tools and are there held with the mouths of their respective bores opening downwardly. The shock imparted to the whole organism connected with the chuck sleeve imparts to the blanks a sudden vibration or agitation which dislodges any debris retained in the bores and it falls out of its own weight. The lower buffer ring 122, performs a similar service in respect to the reamer and all those boring tools which do not fill the bore made by a preceding tool, for if on account of boring in cross-grained wood the inside of the hole is rough and chips cling to the surface thereof, the downward impact of the sleeve 406 with the lower buffer 122 will tend to rattle out such clinging debris. This latter buffer also tends to equalize what otherwise would be uneven strokes of the beam and chuck reel due to inequalities of driving speed or momentum of the down stroke if it was not used, and to fix an absolute, but yielding limit to the down-stroke of the chuck-sleeve 406.

In the consideration of this invention the organism has been treated as adapted to operate in a "vertical" position, and it has been illustrated and described as in a "plumb" or perpendicular position as distinguished from a horizontal position. It has been shown that such position best facilitates the dislodgment of the boring debris or chips, and for that reason, if for no other, is the best arrangement for the operation of the machine. In this the inventor does not restrict himself to an absolutely "plumb" attitude for the pivot standard and coöperative parts which are co-axial therewith, inasmuch as the machine would be practically operative if the entire machine should be somewhat inclined. But the true range of the invention extends to any and every position of the blanks wherein the inclination is not so great as to defeat the influence of gravity as an aid to the discharge or removal of the borings both in the process of their production and accompanying or following the withdrawal of the tool from the bore in the blank. The efficiency of gravity in the operation of the machine will gradually diminish as it is inclined away from the perpendicular or plumb position, but until the inclination of the axes of the blanks is so great that the influence of gravity is neutralized, the inclined position will be within the scope of this part of my invention.

*Operation of the machine.*—This machine is adapted to bore blanks of different lengths within a range of several inches. For that purpose boring tools are provided of graded lengths to accommodate different lengths of blanks including the tool to bore the tip for the lathe center. To adjust the machine to bore blanks of a given length the appropriate set of tools for that length is selected and inserted in the chuck heads of the driving spindles 71 and a proper mandrel for the spindle 711. Bush-bearing 88 is then adjusted so that when the collar 89, Fig. 6, is pressed down until it strikes the top of the bearing 88 the tip of the bit 92 will have entered the tip of the blank as far as desired. Then the button-nuts 104 and 117 are so adjusted in relation to each other that when springs 103 and 116 are in equilibrium the bit 92 will stand at the proper elevation to perform its functions correctly as the reel is reciprocated. The stroke of the beam 25 is then approximately adjusted by fixing the elevation of the bracket 26 by means of the set-screw which binds its hub to post 3 and then moving the pivot shank 27 along in slot 201 of bracket 26 to the desired position and fastening it tentatively after which the pivot stud 275 is rotated by the spanner head 252 until the working end of the beam will give the proper length of stroke to the reel and chucks. If a delicate adjustment of the pitman connection between the end of the beam and the fork-bracket 35 and chuck-sleeve 406 appears necessary to secure a correct stroke of that sleeve between the buffer rings or collars 120 and 122, it may be effected by turning the pitman rod 33 one way or the other as it is screwed into the eyes 31 and 32 by right and left hand screws like a turnbuckle. Chuck-plate 61 is then adjusted to a proper elevation on the chuck-slides 60 by means of the set screws d, d, d, Fig. 13, to suit the lengths of the blanks to be bored. Belt 121 is adjusted to rotate the mandrel in the direction desired. Assuming that the step bearing under the driving shaft 5 is in proper condition and that the screw-plugs 75, bush-bearings 79 and adjusting nuts 80 are in proper adjustment for service, the machine may be started. Assuming that on the start the chuck reel is at the upper limit of its stroke as seen in Fig. 2, with the chuck at the right of the mandrel open as seen in Fig. 1, at 63, the operator inserts a blank in the chuck 63 by hand. Directly on the chuck commencing its down stroke cam 51 acts on the segment ring 113 and segment 85 and by turning it releases the push-pin which controls the lower jaw of that chuck and spring 65 acting instantly closes the jaw centers 62 and 68 over the ends of the blank thus gripping it firmly. The down stroke will then force the blank down over the first bit which is a centering tool which will be bored a short distance. This initial bore remains as a guide for the subsequent boring operations. This centering bit a, has a leading tip of smaller diameter than the main tool which leaves a countersunk center for the point of the next tool to follow. The second bit, b, is known as the "master bit" and has a leading tip to follow the center bore left by the bit a, and this bit bores the long central chamber between the bearings in the bore where the bobbin binds the spindle of the spinning frame. The next stroke of the reel forces the blank over the tool c, which is a long pod bit having a leading tip like the others, and which reams the shives out of this chamber bore and leaves it smooth and true. The next tool, d, has a section of its length made of a size to fit the chamber bore as a guide with a boring tip above it long enough to bore a part of the remaining distance through to the end of the blank. The two following tools are like d, except in length and complete the through boring. The succeeding tool which is a finishing reamer is shaped to give to the spindle seats at the bottom of the blank and at the bottom of the small bore at the top of the blank, their appropriate taper to fit the spindles upon which they are designed to be used. The next upstroke of the chuck-reel will draw the blank off the mandrel thereby releasing it but the pushpin will not pass out from under the segment until the attendant can put a new blank in position to be grasped by the chucking centers to be seized when the segment movement does take place at the commencement of the next downstroke of the chucks. After all the chucks have been loaded each stroke of the beam 25 will turn out a completely bored bobbin.

I therefore claim as my invention and desire to secure by Letters Patent the following:—

1. In a multiple spindle boring machine, a circle of spindles and means for supporting the same adapted to carry a set of boring tools, means for revolving the spindles, in combination with a corresponding circle of blank-holding chucks, a hollow post around which the spindles and chucks are arranged and upon which they are supported, a driving shaft inside said post, mechanism at the lower end of the post connecting the driving shaft with the circle of boring spindles to rotate the spindles through the driving shaft, means for reciprocating the circle of chucks up and down upon and rotating them around the post for the purpose of carrying each of the blanks held in the chucks successively onto and off each of the boring tools, substantially as described.

2. An axially immovable revoluble boring tool arranged to operate in a substantially vertical position with its cutting end pointing upwardly, a device for holding the object to be bored above said tool, means for feeding said object downwardly to said tool and for retracting it thereafter, and means for imparting to the object after withdrawal from the boring tool a sudden shock to promote clearance of boring chips from the bore, substantially as specified.

3. In a vertical boring machine, a top and bottom frame plate, tubular posts connecting the frame plates, a driving shaft mounted inside one of the posts, a gang of bit-spindles operatively arranged around the central post, a sliding sleeve and forked arm mounted upon an outside post adapted to support the gang of chucks, and operate it along the central post, in combination with means for operating the sliding sleeve, substantially as described.

4. In a boring machine, a circular gang of boring tool spindles, a corresponding gang of chucks, a central post around which the circle of chucks are operatively arranged, driving mechanism inside the circle of spindles, an annular hollow bearing-case fixed to the lower end of the post, and carrying the bearings for the spindles, substantially as described.

5. In a machine of the class described, a hollow, substantially vertical pivot standard upon and around which operative members of the machine can slide and turn, a driving member within said standard, a series of locally stationary revoluble boring tools arranged in concentric order around said standard, means intermediate said driving member and the tools for rotating them, a chuck frame equipped with a series of blank-holding chucks coinciding in number and concentric arrangement with said revoluble tools and adapted to slide and turn upon said standard, and means for actuating said driving member, reciprocating said chuck frame and intermittently rotating the same upon said standard, substantially as specified.

6. In a machine of the class described, a fixed, hollow, substantially vertical pivot standard, a driving shaft journaled therein, a gang of boring spindles, gearing interposed between the shaft and the spindles for driving the latter and to carry boring tools concentrically arranged about said driving shaft and spaced equi-distant from each other, a corresponding series of blank-holding chucks and a frame on which they are supported longitudinally movable on said standard, and mechanism for alternately rotating and reciprocating said frame and chucks around and along said standard, substantially as specified.

7. In a machine of the class described, a fixed, hollow, substantially vertical pivot standard, a driving shaft journaled therein, a gang of boring spindles, gearing interposed between the shaft and spindles for driving the latter and to carry boring tools concentrically arranged about said driving shaft and spaced equi-distant from each other, a corresponding series of blank-holding chucks and a frame on which they are supported longitudinally movable on said standard, means connected therewith for alternating, rotating and reciprocating said frame and chucks thereon and for releasing and discharging one blank at each rotative step of the chuck-frame, substantially as specified.

8. In a multiple spindle boring machine, the combination with the boring apparatus, of a work-carrier supplied with a plurality of non-revoluble blank-holding devices and means connected therewith for imparting to said carrier an intermittent movement to advance the blanks successively from tool to tool and to reciprocate the same in line parallel with the axes of the tools, substantially as specified.

9. In a machine of the class described, a fixed, hollow, substantially vertical pivot standard upon and around which operative members of the machine may slide and turn, a concentric series of revoluble, axially immovable upwardly pointing boring tools supported in stationary bearings around the lower part of said standard, a chuck-reel provided with non-revoluble blank-holding chucks, a sleeve journaled on said standard upon which said chuck reel is supported, means connected therewith for imparting a step-by-step rotative movement to said reel, means for imparting a reciprocating movement to said sleeve, a registry plate attached to and centered on said sleeve having registry openings co-incident with the number of chucks in the reel, and an independent fixed registry bar with which said openings co-operate to maintain alinement between the axes of the boring tools and the axes of the blank-chucks during the boring operation, substantially as specified.

10. In a multiple spindle boring machine, a stationary pivot standard, a chuck frame consisting of two heads connected by a series of slides arranged concentrically around said standard and equally spaced, said frame being adapted to rotate intermittently around and reciprocate upon said standard, a chuck-jaw-supporting plate adjustably mounted on said slides, blank centering jaws carried on said plate, a series of clamping jaws supported upon said slides and adapted to reciprocate thereon, means for controlling and actuating said movable clamping jaws to seize and release the blanks, and means for reciprocating said frame upon said standard, substantially as specified.

11. The combination with the chuck-frame, slides and upper jaw-supporting plate adjustably attached to said slides, of the lower chuck-jaws one of which is mounted on each slide and adapted to reciprocate thereon, a corresponding fixed, centering companion jaw for each movable jaw carried on said plate, and means intermediate said jaws for forcibly closing them upon the ends of an inserted blank, substantially as specified.

12. In a multiple spindle boring machine, the combination with the pivot standard, the concentric gang of boring tools, means for operating them, the chuck-reel and non-revoluble chucks and means for intermittently rotating and reciprocating them upon said standard, of the registry plate and registry bar mutually adapted to interlock each with the other, whereby a sliding engagement between them is maintained during the reciprocation of the chuck-reel pending the advancing and retracting action of the blanks, substantially as specified.

13. In a multiple spindle boring machine, a set of boring tools pointing upwardly and means for operating them, a corresponding set of non-revoluble work-holding chucks adapted to force blanks held therein onto and off said tools from the upper side, and means for step-feeding said blanks from tool to tool, substantially as specified.

14. In a multiple spindle boring machine, of the class described, a hollow substantially vertical cylindrical pivot standard, a driving shaft within said standard, a driving gear thereon at its lower end, a concentric series of axially immovable revoluble upward pointing boring tools mounted in stationary bearings each of which is provided with a pinion meshing with said driving gear, a chuck frame and chucks journaled on said standard, means intermediate said driving shaft and the chuck frame for imparting reciprocating motion thereto, upon said standard, for the boring operation, means for intermittently rotating said chuck frame around said standard to feed the chucked blanks from tool to tool, and means for locking the chuck frame in its true circumferential position for boring the blanks during that operation, substantially as specified.

15. In a machine for boring wood blanks, the combination with an upwardly boring tool and a substantially vertical reciprocating blank-holder, and means for actuating said tool and workholder, of mechanism for imparting to the object to be bored a sharp, percussive shock, as a means for clearing the bore of chips, substantially as specified.

16. The combination with a chuck reel, and chucks and means for intermittently rotating said reel by a step by step movement and for reciprocating it upon the pivot standard, an independently driven spindle occupying position in the rank of the boring spindles and provided with a mandrel to fit the bore in the blank its tip being adapted to center in the bottom part of the tip bore of a bored blank, and an independent revolving and reciprocating boring tool adapted to counterbore the tip of the blank, substantially as specified.

In testimony whereof I have hereunto subscribed my name this ninth day of November, A. D. 1908, in the presence of two witnesses.

WILLIAM C. FARNUM.

Witnesses:
 EMILY SCOTT,
 FRANKLIN SCOTT.